(12) United States Patent
Cowans

(10) Patent No.: US 6,247,531 B1
(45) Date of Patent: Jun. 19, 2001

(54) TEMPERATURE CONTROL OF INDIVIDUAL TOOLS IN A CLUSTER TOOL SYSTEM

(75) Inventor: Kenneth W. Cowans, Fullerton, CA (US)

(73) Assignee: B/E Aerospace, Anaheim, CA (US)

( * ) Notice: Subject to any disclaimer, the term of this patent is extended or adjusted under 35 U.S.C. 154(b) by 0 days.

(21) Appl. No.: 09/618,839

(22) Filed: Jul. 18, 2000

Related U.S. Application Data

(62) Division of application No. 08/931,135, filed on Sep. 16, 1997, now Pat. No. 6,102,113.

(51) Int. Cl.[7] .................................................. F24F 3/00
(52) U.S. Cl. ...................... 165/206; 165/264; 165/80.4; 62/259.2; 361/699
(58) Field of Search .................................. 165/206, 264, 165/290, 107.33, 80.4; 62/259.2, 126, 201; 361/699

(56) References Cited

U.S. PATENT DOCUMENTS

| | | |
|---|---|---|
| 2,357,706 | 9/1944 | Toepperwein . |
| 3,735,805 | 5/1973 | Stillhard . |
| 3,847,209 | 11/1974 | Mascall . |
| 5,097,890 | 3/1992 | Nakao . |
| 5,201,187 | 4/1993 | Yoshikawa et al. . |
| 5,333,460 | 8/1994 | Lewis et al. . |
| 5,333,676 | 8/1994 | Mizuno . |
| 5,348,076 | 9/1994 | Asakawa . |
| 5,365,749 | 11/1994 | Porter . |
| 5,413,164 | 5/1995 | Teshima et al. . |
| 5,706,890 | 1/1998 | Sloan et al. . |
| 5,802,856 | 9/1998 | Schaper et al. . |

*Primary Examiner*—James C. Yeung
*Assistant Examiner*—Terrell McKinnon
(74) *Attorney, Agent, or Firm*—Raymond A. Bogucki

(57) ABSTRACT

A temperature control unit for independent control of a number of independent channels, as can exist with a cluster tool used for semiconductor fabrication, has high efficiency, long term life and reliability, and requires only a small floor area. To these ends, the unit employs a single high capacity refrigeration system and disposes a number of separate temperature control channels for the individual tools, with only some channels receiving refrigerant. Low temperature channels use high pressure, sub-cooled refrigerant for chilling the heat transfer fluid to selected levels controlled by proportional valves adjusting refrigerant flow through evaporator heat exchanger units which cool heat transfer fluid. Moderate temperature channels cool the heat transfer fluid for associated tools to an ambient temperature level. The tools may, as needed, be heated by elements in the separate control channels, the control levels for both cooling and heating being determined by servo circuits programmed to measure actual and establish desired temperature levels.

13 Claims, 7 Drawing Sheets

TEMPERATURE CONTROL OF INDIVIDUAL TOOLS IN A CLUSTER TOOL SYSTEM

This application is a division of 08/931,135 filed Sep. 16, 1997 now U.S. Pat. No. 6,102,113.

FIELD OF THE INVENTION

This invention relates to systems and methods for controlling the temperature of individual units and subsystems in a system, and more particularly to a compact and versatile system and method for individually controlling the temperature of different tools in a semiconductor processing system.

BACKGROUND OF THE INVENTION

Many production processes maintain control of the temperature of individual units or elements within an overall system by refrigerating or heating the individual units during operation of the system. A particularly noteworthy and critical example of the type of demanding environment in which precise temperature control is needed is found in semiconductor fabricating processes. The manufacture of integrated circuits by forming multiple replicated patterns on semiconductor wafers involves numerous successive steps. Following image replication, intense energy concentrations are used to etch, deposit and otherwise treat successive layers on the wafer, but at the same time precise placement, alignment and dimensional stability of the wafer must be maintained during practically all such process steps. Furthermore the final product cannot accept even minuscule defects even though temperature differentials can tend to distort wafers, affect alignments and deteriorate pre-existing layers. Given these and other considerations, semiconductor fabrication facilities require vast capital expenditures to provide tools and support equipment meeting the conflicting demands of quality control and high volume output at the levels of resolution now demanded by the state of the art.

An example of one type of semiconductor fabrication equipment now in wide use is the cluster tool, in which different closely juxtaposed tools are used, singly or in combination, to transport, position, and complete different ones of a succession of processing steps quickly and efficiently. The tools within the cluster can vary widely in purpose and function. Some tools in the cluster may have to be refrigerated at times to levels as low as −40° C., while at the same time others may have to be heated to levels as high as 80° C. to 100° C. The levels will vary during a process, but at any given time, the then chosen temperature level must be maintained closely at each operative tool. In addition, abrupt temperature changes are sometimes needed. For instance, extremely rapid cooldown of a tool at a transition point in a procedure may mean that the overall process can be significantly shortened or substantially more efficient. If transition times can be markedly shortened for tools when they are within an evacuated process chamber, the same chamber can be used again for a different step, without the need for returning the chamber to ambient pressure and reestablishing the vacuum, or utilizing a second chamber for the subsequent processing step.

The different tools in a cluster have heretofore largely been refrigerated or heated by individual units, each using a separate prime refrigeration source with a compressor/condenser system, or a separate heater. This not only affects reliability by increasing the number of critical and active operating units, but also requires that a substantial amount of floor space be dedicated to the cluster tool. However, every square foot of area required in a semiconductor fabrication facility is extremely costly. A large "footprint" size thus imposes a substantial economic penalty. Modern temperature control units for a cluster tool having, for example, six tools, require in the range of 18 square feet or more of floor area. Moreover, the service lifetime of these systems is limited because of the need to use multiple small refrigeration units, since they have shorter lifetimes than larger units and offer more chances of failure.

On-line maintenance of cluster tools requires that they be flushed of heat transfer fluid and disconnected from the temperature control unit. Current approaches typically use quick disconnects, which allow fluid to spill, and which tend to leak after a number of operations and impose a significant pressure drop in the system. An efficient subsystem for flushing and filling fluid used in temperature control is therefore highly desirable.

Precise control of the temperature of refrigerant-cooled fluid over a long service life is a desirable goal seldom achieved in practice. Solenoid valves, bimetallic proportional valves and other controls often used have inherent wear and hysteresis problems which affect both their accuracy and long-term life. Thermal expansion valves are capable of better resolution and proportional control, but present new problems when used in a refrigeration system for cluster tools, since it is the tool temperature which must be regulated, not superheat as in prior systems. In addition, prior thermal expansion valve systems are not usually able to effect extremely rapid cooldown because of thermal inertia problems.

SUMMARY OF THE INVENTION

A system in accordance with the invention concurrently operates a number of thermal control channels for thermal transfer fluid, each channel having both cooling and heating capability for adjusting the temperature of an associated process device. This system advantageously serves as a compact multi-channel temperature control unit for the different tools in a cluster tool.

In accordance with the invention, individual tools in a cluster tool used in semiconductor wafer processing are differently temperature controlled by control loops circulating selectively heated or cooled thermal transfer fluid. The control loops respond to sensors which measure actual tool temperatures and include circuits for providing the signals for regulating thermal transfer fluid temperature. Those channels requiring significant chilling receive a subcooled, high-pressure refrigerant from a single refrigerator unit having a total refrigeration capacity sufficient to meet the total demands of all the tools. A high pressure refrigerant, after compression, condensation and subcooling, is fed out in separate lines to the different control loops, where pressurized heat transfer fluid is circulated through the tools. The control of refrigerant flow to each different evaporator in the loop determines the amount of refrigeration capacity used to cool the heat transfer fluid and hence the tool. Thereafter, the expanded refrigerant is returned to the single refrigeration unit.

Further, in accordance with the invention, all channels in a multi-channel system circulate thermal transfer fluid replenished from a single pressurized tank in separate control loops including the pressurizing pumps, heat exchangers and heaters. The low temperature channels incorporate compact evaporator/heat exchange units controlled by thermal expansion valve units which are arranged to respond to tool temperature and also to prevent astable operation. Where only moderate cooling need be supplied to a tool, the heat exchangers in the respective channels receive only utilities water or other cooling medium at some ambient temperature. The heaters in the control loops are energized to raise the temperature of the heat transfer fluid when the tools are to be operated at temperatures above ambient.

The channels are configured with flow control valves which allow disconnection of the lines to any tool for service. The lines for heat transfer fluid that couple to and from the tool are disposed with at least one low point below the tool level, and include purge valves coupled to the low point and the vicinity of the tool. The temperature control unit includes separate lines coupled to the pressurized tank from each control channel. A pressurized source of purge gas is usually readily available for use in flushing. The entire loop section that includes the lines to and from the tool and the tool itself is effectively purged by using the purge gas to force heat transfer fluid through the tool from the low point and into the pressurized tank. The return line can further be purged in an opposite direction back through the return coupling to the pressurized tank. The tool can then be serviced or replaced and reconnected. To refill the lines and the tool with heat transfer fluid, the pressurized fluid source, which may be augmented by purge gas pressure, is coupled into the lines and into the tool as the flow control valves are held open and a point is vented to atmosphere. This mode of operation and configuration greatly facilitate the flush and fill functions, both in terms of reducing time and eliminating the often substantial leakage and dispersion of heat transfer fluid around the area.

A feature of this arrangement is that only a single large refrigeration system in used to cool a fluid in the different number of channels. Such an approach greatly reduces the parts count, while increasing the reliability of the system because large refrigeration systems are inherently more reliable than smaller units. In addition, the single refrigeration unit incorporates elements and subunits which improve its efficiency and reliability, such as a subcooler for interchanging thermal energy with low pressure suction return gases, an injection capillary system, a hot gas bypass and a superheater expansion valve system, as well as gas filter and oil separator devices. There is more efficient use of space because the total volume required is less than what individual units would require for the same capacity.

In addition, this system substantially reduces the critical floor space area that is needed because all the subsystems may be compactly disposed within an open sided frame having a small area base. An array of pumps and closely spaced in-line motors are mounted within the upper part of the frame. The compressor for a high capacity, high efficiency refrigeration system is disposed within the frame alongside and lower than the pump/motor array. Other units in the refrigeration system are disposed below and alongside the array. An accumulator vessel and a pressurized tank for heat transfer fluid are placed at opposite sides of the frame. A row of heat exchangers and flow controls for the chilled loops are disposed side by side below the array. Inlet and outlet ports and conduits for interconnection to the lines running to the tools and utility water are all accessible at an open side of the frame. The pump/motor combinations for the chilled channels can be disposed in the interior of the frame, for better isolation from ambient temperature effects. With the inlets, outlets and valves all accessible from the one side, manual connections, including manual connections of fluid and gas lines, and manual controls are all conveniently available. Manifolds are used to distribute cooling water, refrigerant, and heat exchange fluid from common sources to the different channels. For the unchilled channels, small heat exchangers are disposed on the opposite side from the open frame, alongside the pump/motor array. The replenishment and purge line are small and woven throughout the system. All chilled units and lines are covered with insulation extending out to the exterior tools. The footprint for a unit having three total channels, one or two of which can be chilled to −40° C., is less than 0.6 ft.$^2$ per channel. A footprint of 12"×34" has also been realized for a system with greater than 4000 watts cooling capacity at −40° C., and which includes three moderate temperature and three low temperature channels.

The proportional valve systems are of a long lifetime thermal expansion valve type that has no wearing or frictional parts and provides precise proportional control. However, the tool temperature that is sensed is not directly controlled, since in this system, control is at the input to the evaporator/heat exchanger. If the sensed tool temperature demands a response beyond the capacity of the evaporator, then the evaporator efficiency may enter an astable phase in which evaporator output increases rather than declines, so that further valve opening decreases rather than increases chilling. The evaporator output may also contain liquid refrigerant, a condition to be avoided at the compressor. The problem is obviated in one example by employing a reference evaporator in parallel to the chilled channels, and controllably heating pressure bulbs thermally coupled to the reference evaporator but communicating with flow control valves in the different channels. In addition, parallel flows from the evaporator outputs may be combined and the return flow temperature to the refrigeration unit used to limit flow to assure that excessive refrigerant flow will not be demanded. In a second version of an improved thermal expansion valve system for controlling multiple channels, superheat temperatures are measured at each evaporator, including the reference evaporator, and the controller is used to diminish heater temperatures in inverse relation to the difference between the individual evaporator output levels and the reference evaporator output level.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
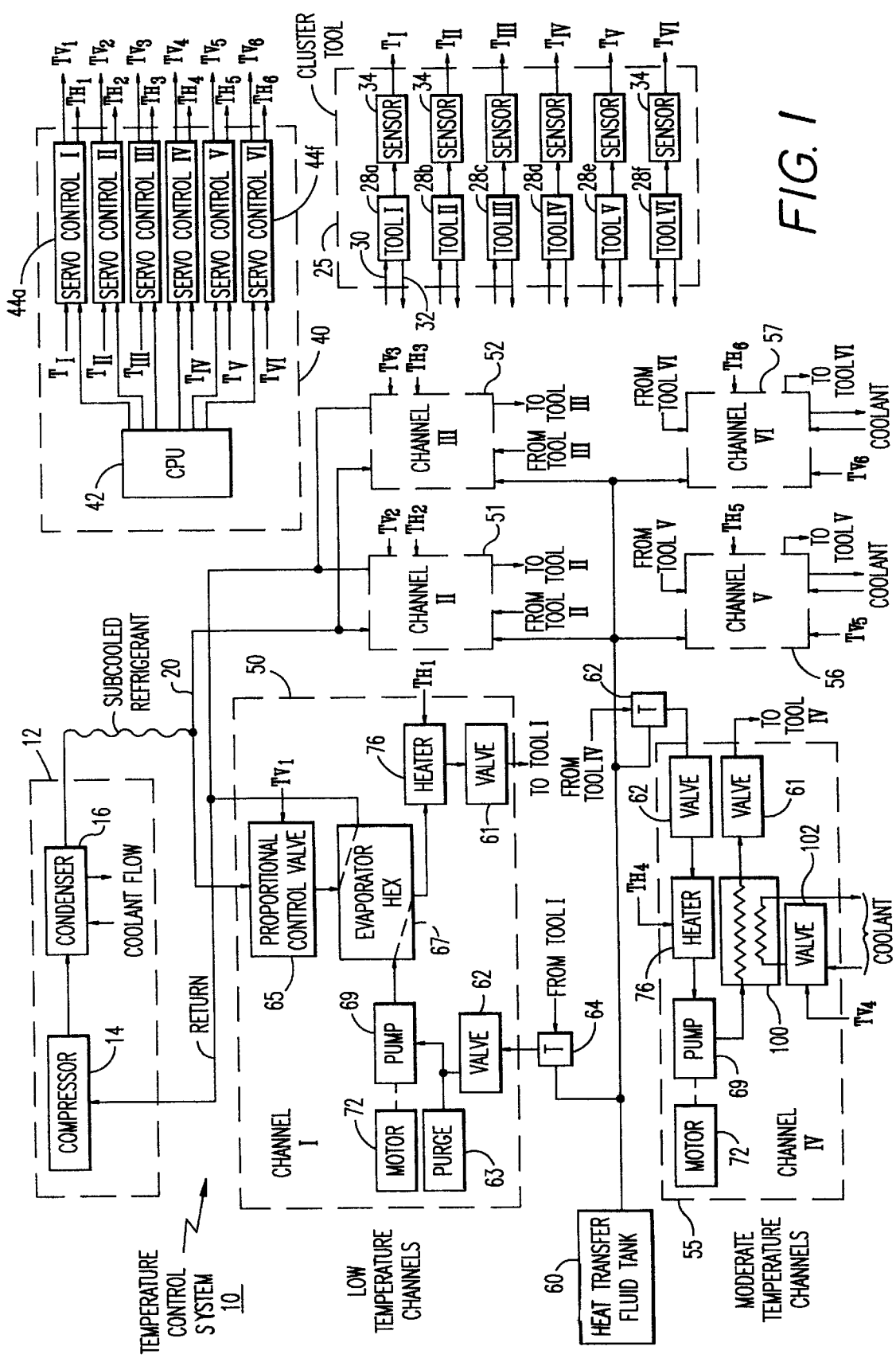
FIG. 1 is a block diagram representation of an exemplary system for multiple channel cooling in accordance with the invention.

A practical example of the system in accordance with the invention is described as used in conjunction with a cluster tool for semiconductor fabrication that requires six different control channels. Each channel typically is used to hold its associated tool at predetermined temperature levels at different points in its operative cycle. In FIG. 1, to which reference is now made, a multi-channel temperature control system 10 having six different channels employs a single refrigeration system 12 including a compressor 14 and condenser 16 receiving a conventional cooling medium (such as air or a liquid coolant). The refrigeration system 12 includes a number of functional subsystems, described below in conjunction with FIG. 2, which improve efficiency and insure longer life. The compressor 14 is from 6 Hp to 10 Hp capacity in this example, since it is desired to provide in the range of 4000 watts cooling at −40° C. An environmentally safe refrigerant, such as R22 or R507, is subcooled to approximately 10° C., providing a high pressure subcooled stream (approximately 200 psi) to a manifold 20 for feeding the different channels of the unit. R507 is preferred, since it provides greater refrigeration capacity than R22.

A cluster tool 25, shown only diagramatically, incorporates a number of individual tools 28a, 28b, . . . 28f. For purposes of this illustrative example, the tools 28a to 28f are alike with respect to temperature control, each having an inlet 30 and outlet 32 and internal passageways (not shown) for circulating a thermal transfer fluid which heats or cools as required at a particular time. The thermal transfer fluid (such as a perfluorinated compound, a glycol or a glycol and water mixture commercially available under different trademarks) is returned to the associated control system, described below, for the required temperature adjustment. One or more sensors 34, each in thermal interchange relation with a different individual tool 28a, 28b. . . 28f, generate separate signals indicating the temperature levels of the individual tools 28a. . . 28f. A control system 40 providing closed loop servo control of the individual channels includes one (or more) central processor units (CPUs) 42 which use programmed reference signals to establish target temperatures for the individual servo controls 44a–44f. The servo controls 44a–f are each associated with a different control channel (I through VI) and provide two available control signals for each different channel. One control signal ($T_h$) operates a heater device and the other control signal ($T_v$) operates a refrigeration control valve, these signals being differentiated by channel subscripts 1, 2 . . . 6. Thus for channel I, the signals are $T_{v1}$ and $T_{h1}$. The different servo reference signals are established by tool temperature programs in the CPU 42. Servo error signals are generated within the servos 44 by comparison of the reference signals to the inputs $T_I$ . . . $T_{VI}$ from the different temperature sensors 34. These servo loops can be integrated into the CPU 42 but are shown as separate for clarity.

In the multi-channel temperature control system 10, the individual control channels are divided into two sets, here each three in number. The members of a first set, called "low temperature channels" 50, 51, 52, each receive not only the control signals (e.g., $T_{v2}$ and $T_{h2}$) but also the subcooled, high-pressure stream of refrigerant from the supply manifold 20 and the heat transfer fluid in the flow loop to the tool. A single pressurized fluid tank 60 provides the heat transfer fluid to all the channels.

The low temperature channels not only provide substantial refrigeration capacity, to lower the temperature to as low as −40° C., but also may heat the tool to 80°–100° C. on demand. The "moderate temperature" channels 55, 56, 57 in the second set receive the heat transfer fluid from the tank 60 and water from an ambient source, usually an available utility, but do not use refrigerant. The moderate temperature channels thus provide cooling to the ambient temperature level, or heating as high as 80°–100° C.

All channels include valves 61, 62 at their output and return connections for control of heat transfer fluid flow to and from the associated tool. In addition, the channels include gas purge connections, as described below in conjunction with FIG. 6, so that the heat transfer fluid can be flushed for disconnection and maintenance of the tool and then the system can be refilled. Once filled, the fluid loop is essentially closed, although leakage can be compensated by replenishment of fluid from the pressurized tank 60 through a separate line to a T-connection 64 in the return valve 62.

Figure 3:
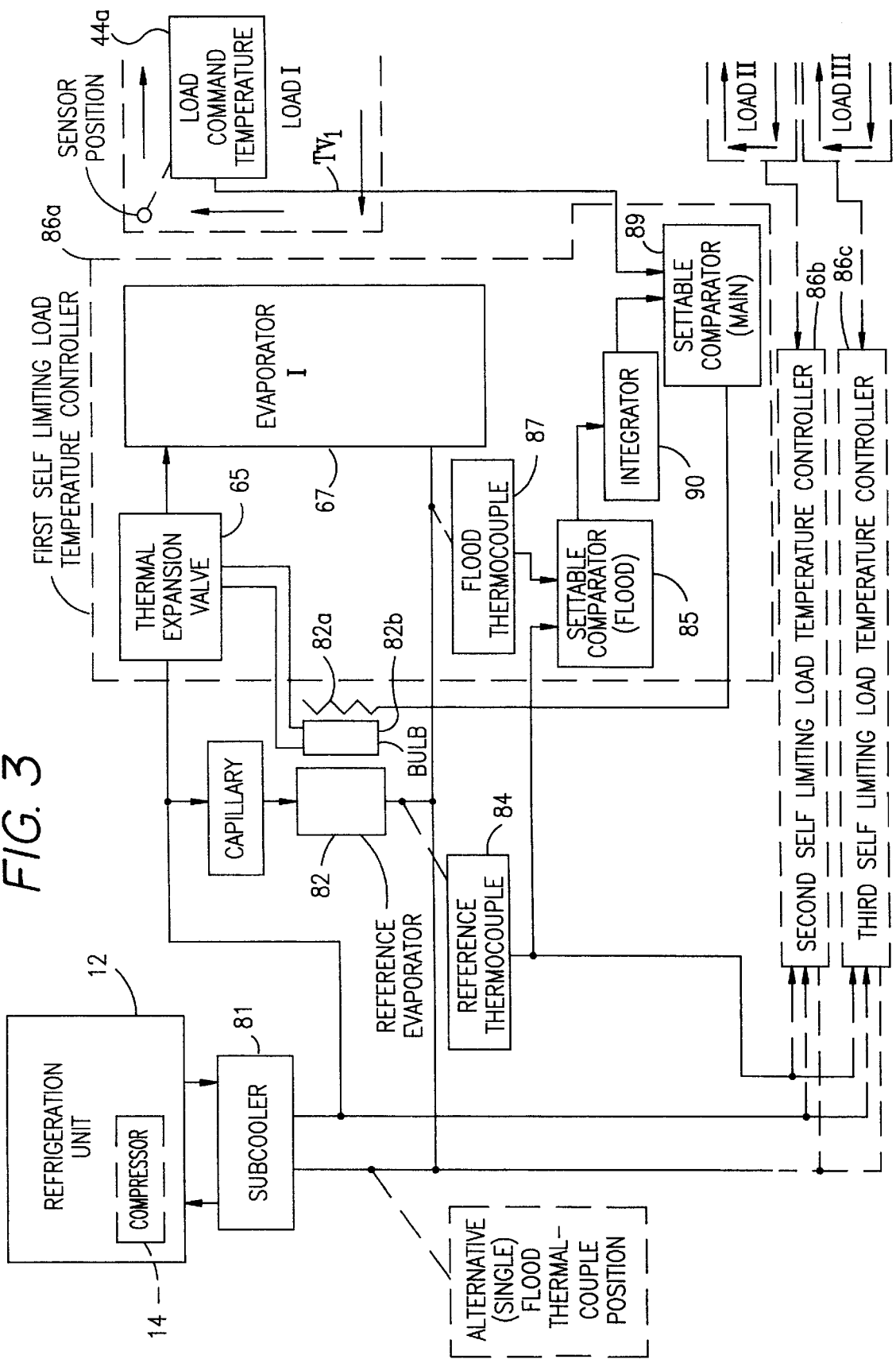
FIG. 3 is a block diagram representation of elements employed in channels in which the tool is to be maintained in a low temperature range, showing further details thereof including an improved thermal expansion valve system for the low temperature channels.

Within a given low temperature channel, such as that numbered 50 (channel I), as shown in FIG. 1 and the more detailed diagram of FIG. 3, the subcooled, high-pressure stream from the refrigeration unit 12 is supplied via a proportional control (thermal expansion or "TXV") valve 65 to the evaporator in an evaporator/heat exchanger combination 67. The expanded gas applied to the evaporator/heat exchanger 67 thus cools the thermal transfer fluid to that level established by the thermal expansion valve 65. A pressurizing pump 69, driven by a closely spaced collinear motor 72, and surrounded by insulation 74, receives return fluid from the outlet 32 (FIG. 1 only) of the associated tool. The pump 69, preferably of the regenerative turbine type, pressurizes the heat transfer fluid as it gives up heat to the evaporator/heat exchanger 67 in the channel, if cooling is needed. An electrical resistance heater 76 is also in the flow channel, and responsive to control signals ($T_h$) to heat the fluid to a higher level tool temperature specified by the control program.

The proportional flow control or thermal expansion valve 65 used in the system is a stable, frictionless, highly reliable thermal expansion unit that provides sensitive control of flow through a wide dynamic range. In the body of a proportional flow control valve such as the TXV 65, a flexible diaphragm forms one wall of a confined volume that is filled with a pressurized gas. The interior of the confined volume in the valve 65 communicates with a separate closed bulb via a small conduit. Flexure of the diaphragm in the valve 65 in response to pressure changes within the bulb shifts the position of the diaphragm and a coupled movable valve element which receives refrigerant from a conduit, thus increasing or restricting flow as commanded. The command pressure is determined by the setting of a heater coil about or adjacent the bulb , which setting corresponds to the desired temperature for the tool. The thermal exchange between the bulb and an associated cold source is attenuated by an interposed insulation. As described in a pending application of Richard Petrulio et al. entitled "Expansion Valve Unit", Ser. No. 08/555,001, filed Nov. 9, 1995, the heating of the bulb enables rapid adjustment of the target temperature and therefore the flow into the evaporator. The insulation effectively integrates momentary variations in evaporator output temperature, which can be considerable, and which would otherwise introduce a short term variable.

Usually, the bulb coupled to a proportional flow control valve 65 is in conductive contact with the element or conduit whose temperature is to be directly regulated, such as the superheat temperature at an evaporator. Here, however, the sensed temperature is that at the relatively remote tool, not the evaporator output. One cannot assume that the response characteristic is monotonic. Refrigeration cycles, in fact, become astable and the compressor can be damaged if the evaporator receives so much refrigerant that it delivers a gas-liquid mix. Instead of greater cooling with increased flow the refrigeration output then decreases. A point is thus reached at which further opening of the valve no longer is wanted, since calling for more refrigeration for the tool is self-defeating. In accordance with the present invention, the subcooled refrigerant from the refrigeration unit 12 is applied to the separate lines to the different low temperature channels 50, 51 and 52.

The disposition of the elements in each of the channels being essentially alike, only that in channel I (50) is shown in detail. Referring to FIG. 3, the refrigeration unit 12 is essentially that which is shown in a different figure (FIG. 2) and the compressor 14 is shown in dotted line form because it is important to the functioning of the unit to avoid the return of liquid refrigerant to the compressor (the "flood condition"). Energy is conserved by using the subcooler 81 in a heat exchange function to interchange thermal energy between the colder returned gases and the high pressure, but moderate temperature refrigerant exiting from the refrigeration unit 12, prior to expansion.

At the reference evaporator 82, the input refrigerant is provided via a capillary 83 which, in known fashion, provides maximum expansion, lowering the output of the evaporator to a minimum, here about −50° C. The reference evaporator 82 is small and because it is not subjected to a thermal load of any significant amount, there is virtually no superheat or likelihood of a flood condition.

The output temperature is sensed by a reference thermocouple 84 which feeds a signal to each settable "flood" comparator 85 in three self-limiting load temperature controllers 86a, 86b, 86c. This is much more than a comparator, because it can be set to give a signal which varies in accordance with the difference between two other signals received as inputs (usually from thermocouples). This can be a commercially available "Watlow Series 965" controller from Watlow Controls, Winona, Minn. that provides a pulse with modulated output that represents the difference between the signal from the reference thermocouple 84 and a signal from a "flood thermocouple" 87, which represents the output temperature in the return line to the refrigeration unit 12 from the main evaporator 67 (see also FIG. 1) in the controller 86a.

This output line is joined with the output from the reference evaporator 82, but the conduit 88 is preferably made of a low heat conductive metal, such as stainless steel, so that the temperature difference does not cause significant heat transfer along that length of conduit. Furthermore, the flood thermocouple 87 is positioned on the underside of the output line 88 close to the evaporator 67, because if liquid is present in the two-phase refrigerant, it will be on the bottom of the line and thus the sensed temperature will be more sensitive to the presence of the liquid.

The specific value which the settable flood comparator 85 is attempting to respond to is the difference between the −50° C. typically sensed by the reference thermocouple 84 and a lesser value sensed by the flood thermocouple 87. If the superheat of the evaporator 67, i.e., the increase in temperature across the evaporator 67 as it interchanges thermal energy with the load (load I of FIG. 1) is high, there is no danger of a flood condition. If the temperature difference between the evaporator 67 and the reference evaporator 82 outlets decreases down to about 35° C., however, then the system starts restricting the thermal expansion valve 65 that controls flow into the evaporator 67, if the temperature command $T_{V1}$ at the load calls for more refrigeration. When the temperature difference becomes only 10° C. (i.e., the evaporator refrigerant output is at −40° C.), then the invention shuts the thermal expansion valve 65 completely. This is done by comparing the load temperature command to the signal from the settable flood comparator 87, using the two inputs to a settable main comparator 89. At the limit conditions, the load temperature becomes immaterial and more refrigeration is needed to avoid the flood condition. The settable main comparator 89 controls the heater 82a which adjust the temperature and therefore the pressure at the sensing bulb 82b which regulates the thermal expansion valve 65.

The input from the flood settable comparator 87 is a pulse width modulated signal, and to avoid erratic operation, this is signal time averaged by an integrator circuit 90 before application as an input to the settable main comparator 89. Then, the settable main comparator 89 provides a heating control signal to the resistance heater 82a with the objective of preventing the evaporator 67 outlet temperature from dropping below −33° C.

Thus, in the thermal expansion valve 65, as long as no flood conditions exist at the evaporator 67 output, the settable main comparator 89 controls the heater 82a which changes the pressure in the thermal expansion valve 65, allowing the thermal expansion valve 65 to open and close so as to supply refrigerant flow to the evaporator 67. If the evaporator 67 does not superheat enough and its temperature drops to where flooding might occur, then the restriction on the output of the thermal expansion valve 65, until it is finally shut down if the flood thermocouple 85 senses a temperature of −40° C.

A single reference thermocouple 84 is used with other bulbs and other heaters for the second and third self-limiting load temperature controllers, even though such bulbs and heaters are not shown separately. As in the pending application of Richard Petrulio et al. entitled "Expansion Valve Unit", Ser. No. 08/555,001, filed Nov. 9, 1995, insulation is disposed between the bulb and the adjacent source of cold, so as to slow thermal energy transfer to eliminate sudden transitions in pressure and also to limit heating of the reference evaporator 82.

The second and third controllers can, in this version, independently control the associated loads (II and III) without interaction with the other controllers in the group.

In the moderate temperature channels, as in that numbered 55 (channel IV) referring again to FIG. 1, the amount of refrigeration needed is less, since the tool is usually operated hot, although it may sometimes have to be cooled quickly to ambient level for service or changing fabrication modes. At the lower limit this temperature will typically be the temperature of available water from local utilities. This ambient coolant is supplied to the heat exchanger 100 in the channel from an external source (not shown). Under the stated conditions, a solenoid valve 102 in the coolant flow path provides acceptable control of tool temperature by on-off operation. However, a proportional control valve can be used if long life, high precision operation is desired.

The moderate temperature channels are each pressurized by their individual compact collinear motor 72 and pump 69 combination, but insulation is typically not utilized. As in the low temperature channels, a resistance heater 76 is in the flow system to raise the temperature of the fluid to as much as 80° C. to 100° C. An electrical resistance heater is not the only type of heater that might be employed but satisfactorily meets the long lifetime, low cost and high performance characteristics desired for the system.

Figure 2:
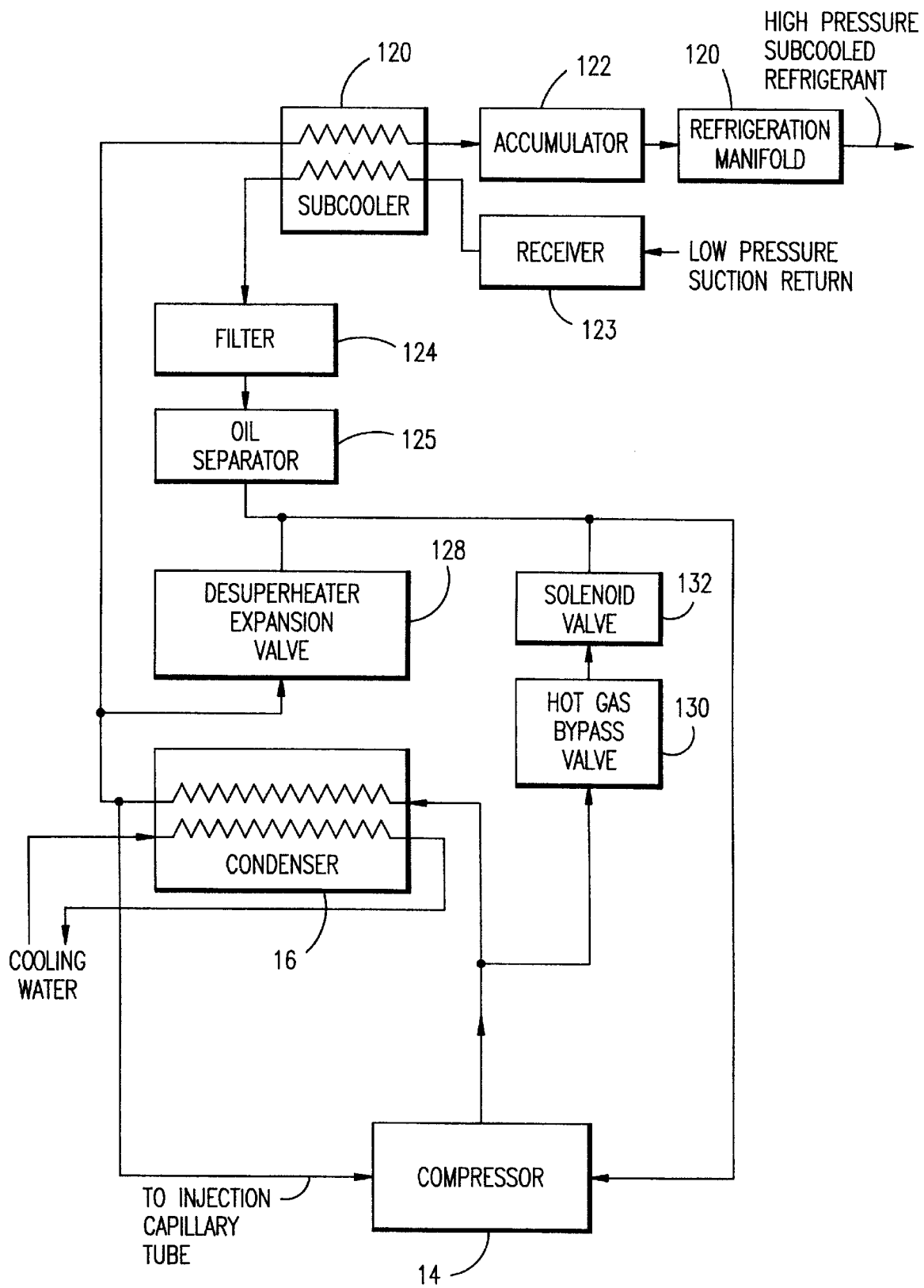
FIG. 2 is a block diagram of a single, large capacity, refrigeration unit for feeding a subcooled, high-pressure stream to low temperature channels in the system of FIG. 1.

A high efficiency but compact single refrigeration system is depicted in general form in FIG. 2, which shows the compressor 14, condenser 16 and the path by which high pressure, subcooled refrigerant is supplied via the refrigeration supply manifold 20 to the associated low temperature channels. Starting at the compressor 14, output refrigerant after compression passes through the condenser 16, which is cooled by conventional means, here water from an available utility, and is directed through a subcooler 120, in counterflow relation to low pressure suction return flow provided from a refrigerant receiver tank 123. The outgoing refrigerant passes through an accumulator 122 to the refrigeration manifold 20. In the subcooler 120, the cooled low pressure suction return is therefore used to subcool the refrigerant while increasing in pressure passing through a filter 124 and oil separator 125 before reaching the compressor 14 input.

A number of other expedients are used for additional safety and efficiency. The cooled, high pressure output from the condenser 16 is fed back into an injection capillary tube (not shown) in the compressor 14 for automatic cooling. The same output is also directed into the input line to the compressor 14, through a desuperheater expansion valve 128, thus drawing off a portion of the refrigerant flow when the maximum refrigeration output is reached. A more direct loop between the compressor 14 output and input is provided by a hot gas bypass valve 130 and a serially connected solenoid valve 132. Thus, if the pressurized output from the compressor 14 is at too high a temperature, a portion of this flow is routed back to the input via the solenoid valve 132. This bypass loop is selectively shut off by closing the solenoid valve 132. The individual units in this single refrigeration system act automatically, apart from the solenoid valve 132, which has a low duty cycle in any event.

This example of a single high efficiency refrigeration unit is provided along with a specific depiction of a practical system to demonstrate that severe operational requirements and volumetric constraints can concurrently be satisfied.

Given the fact that three or more tools are to be chilled to low temperature by this single refrigeration system, the needed refrigeration capacity can still be provided considerably more efficiently than by separate small units. The refrigerant is conducted essentially through three independent control loops or branches before returning to the single system with its advantageous internal filtration and oil separation, and other expedients such as bypasses, feedback and shutoffs for improving safety factors and increasing internal efficiency. Thus with a 10 horsepower compressor, the total cooling capacity at −40° C. can exceed 4,100 watts, and substantially greater levels of cooling capacity can be reached if the lowest temperatures can be raised.

This system has the versatility to be used with a variety of cluster tools so as to provide the needed spectrum of temperature control conditions, even though in other instances the mix of moderate and low temperature channels might be somewhat different. If so, it is evident that the same principles can be utilized even though the numbers of individual channels in the mix will be altered.

In operation, as the refrigeration unit 12 is continuously operating to provide subcooled refrigerant to the low temperature channels 50, 51, 52, pressurized heat transfer fluid is passing, at selected temperature levels dependent upon the processing cycle, through the corresponding first three tools 28a, 28b and 28c. Concurrently, heat transfer fluid is passing through the remaining three tools 28d, 28e and 28f via the moderate temperature channels 55, 56, 57. Previously set temperatures are maintained by use of the proportional control valve 65 in the subcooled refrigerant line feeding the evaporator/heat exchanger 67 in the first low temperature channel 50, for example. In the moderate temperature channels, such as the fourth channel 55, while the heat transfer fluid flows through the heat exchanger 100, the utilities water flow is controlled in on-off fashion by the temperature control signal applied to the associated input valve 102. Thus the temperature of the heat transfer fluid and the tool can be lowered rapidly. In most instances, steady state operation of the moderate temperature channels will be at above ambient temperature and then when there is a process transition, the tool will be cooled as quickly as allowable to ambient temperature.

Individual electrical resistance heaters 76 are incorporated in the low temperature channels, and similar heaters 76 are separately included in the moderate temperature channels as well. These heaters 76 enable the temperature levels to be brought to the desired maximum range, up to no more than about 100° C. in this example.

Even though the temperature control unit is designed for long-term continuous operation, the system incorporates means for disconnecting the fluid lines in the control channel from the tool to which it is coupled. Such disconnection is primarily for purposes of tool maintenance, reconditioning or replacement. Flushing the heat transfer fluid out of the system, and later refilling the system, is generally done only cumbersomely in the prior art. Quick disconnect couplings that are employed tend to leak, particularly after a few cycles of use. They also inevitably involve spillage and also introduce a substantial pressure drop in the lines. The present system includes a flush and fill arrangement described below that performs these functions in a rapid, controlled and simple manner.

Figure 4:
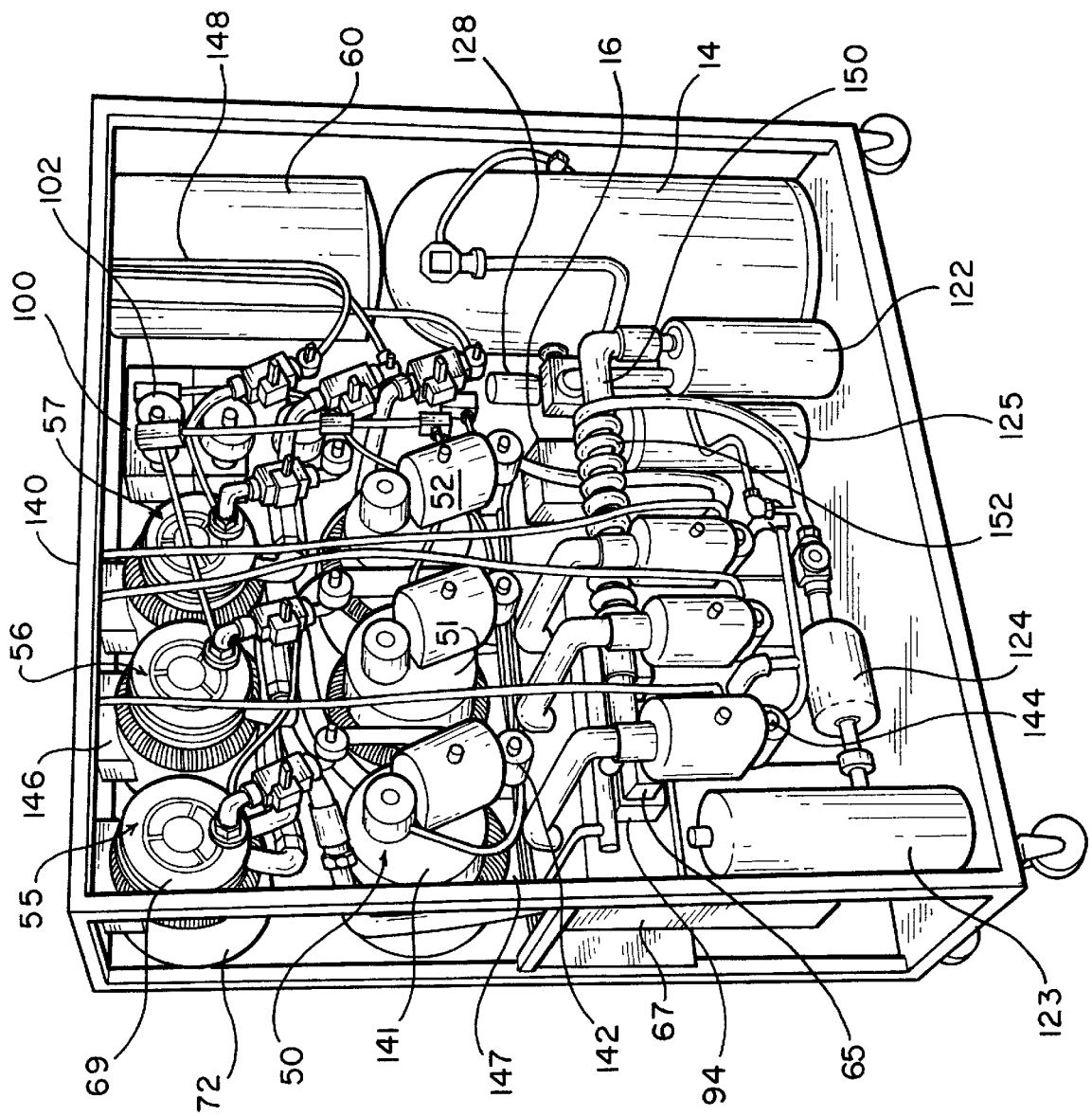
FIG. 4 is a perspective view, simplified as to some lesser details, of the physical layout of a practical multi-channel, temperature control unit in accordance with the invention, showing how the desired compact, low footprint combination is achieved.

In accordance with the invention, referring now to FIG. 4, the needed refrigeration capacity, pumping, control and heat exchange functions for interaction with the individual tools have all been accommodated within a single open and compact mechanical frame 140. The frame 140 is of simple rectangular form in this example although it could be of other geometries and is mounted, as shown, on rollers for mobility. The floor area commitment is substantially lower than prior systems have heretofore required. In the practical example shown, the floor area covered is only 12"×34", while the height of the frame itself is only 34". The shallow depth and relatively short frontal length enable the assembly to fit into close quarters on the floor of a fabrication facility. For purposes of description, the exposed broad side of the frame 140 in FIG. 4 will be referred to as the "front".

The motor 72 and pump 69 combinations are disposed within the frame 140 along spaced apart but parallel horizontal axes in an array that principally occupies one upper corner of the frame 140. The motors 72 are directly coupled to the collinear pumps 69, through a short insulating spacing, with the ends of the pumps 69 lying essentially in the same plane, and in the front to back direction. The interior volume occupied by this array locates the pump 69 ends in an accessible front plane along a broad vertical side of the frame 140. Thus, line connections can be made at this side, and servicing can be accomplished readily because of easy accessibility to virtually all interior components. In this example, the three low temperature channels 50, 51 and 52 including the three evaporator/heat exchangers which are side-by-side, are within the interior of the frame 140, while the pump/motor combinations for the moderate temperature channels 55, 56, 57 are directly above, immediately below the top of the frame 140. The pumps 69 in the low temperature channels 50, 51, and 52 are thus less exposed to the working environment, and insulation 141 about them is thereby more effective.

The input and output couplings for connection to the associated tools (not shown) are disposed in a second distributed array horizontally adjacent the pump/motor combinations, with the connector ends being closest to the plane of the access side. For example, for the low temperature channels, the return couplings 142 are along a horizontal axis in the mid-region of the frame 140. The outlet couplings 144 are along a lower horizontal level somewhat above the base. Both are covered by insulation 141. These couplings include manually operable valves and T-connections for coupling to feeder lines, full details of which are not shown in FIG. 4 in order to avoid overcomplicating that Figure. Similarly, connections for the supply and return of utilities water, located at the right bottom portion of the access side, wiring and control circuits, and various other small and detailed features, are shown either diagrammatically or not included, to avoid excessive details and explanation of features that are self-evident once the basic geometry is understood.

Primarily, it must be understood that FIG. 4 shows the principal elements of a practical system in which all of the operative components and subunits, whether specifically depicted or identified or not, are compactly incorporated within a frame of relatively small dimensions. In this example, the pump/motor combinations are arranged such that the return couplings 142 extend directly outward at the access (front) side of the frame 140. The pumps 69 lie at two levels, and include T-couplings as well as manually operable valves that are conveniently placed at the front of the frame. The outlet couplings for the moderate temperature channels 55, 56, 57 are within the same interior volume of the frame 140 but vertically disposed alongside the end of the array of pump/motor sets, at the right side of the vertical center of FIG. 4.

The upper pump/motor combinations are physically connected to the frame 140 at a top panel or support by upper brackets 146, while underside brackets 147 support the lower or central set of pump/motor combination on supports in the mid region of the frame 140. This arrangement is both compact and allows the couplings to be conveniently available for external connections, with adequate volume available for the different functional units of a refrigeration system having large capacity.

Viewed as they are located in FIG. 4, such subunits and elements can be referred to as in "upper", "lower", "right" and "left" locations for convenience. Thus, the pressurized tank 60 for heat transfer fluid is mounted to depend from the upper right-hand side of the frame 140 just above the large compressor 14 which is mounted in an upstanding position on the floor of the frame 140. The suction accumulator 122 is a smaller tank on the right side of the frame at the floor, and coupled to the horizontal cylindrical body 150 of the subcooler 120, with the encompassing coil 152 about the subcooler cylinder 150 leading horizontally through the filter 124 to the refrigerant receiver tank 123 which is at the left front side of the frame 140. Behind the insulated outlet couplings 144 for the low temperature channels 50, 51, 52 are disposed a row of evaporator/heat exchanger units 67, in the immediate front of which are the proportional control valves 65. A reference evaporator is also accommodated within this space between the insulated outlet valves 144 and the evaporator/heat exchangers 67. An oil separator 125 is disposed on the floor of the frame 140 behind the suction accumulator 122, and a desuperheater expansion valve 128 is located above it, adjacent the compressor 14. The condenser 16 is positioned to the right of the evaporator/heat exchangers 67 on the side of the compressor 14. The heat exchangers 100 for the moderate temperature channels are behind a vertically aligned group of solenoid valves 102 for those channels, between the array of pump/motor combinations and the pressurized tank 60 for heat transfer fluid. A number of small conduits 148 run from the outlet couplings 144 to the top of the frame 140, where connections can be made through self-closing valves to a purge gas source.

With this arrangement, a single, highly reliable refrigeration unit can feed branch lines to the different control units and their operative subsystems, and all of the necessary interconnections and thermal exchange relationships can be established in a much more efficient configuration than was achievable. The saving in floor space at a semiconductor fabrication facility, which is sometimes calculated in terms of $100,000 per square foot, is very substantial.

Figure 5:
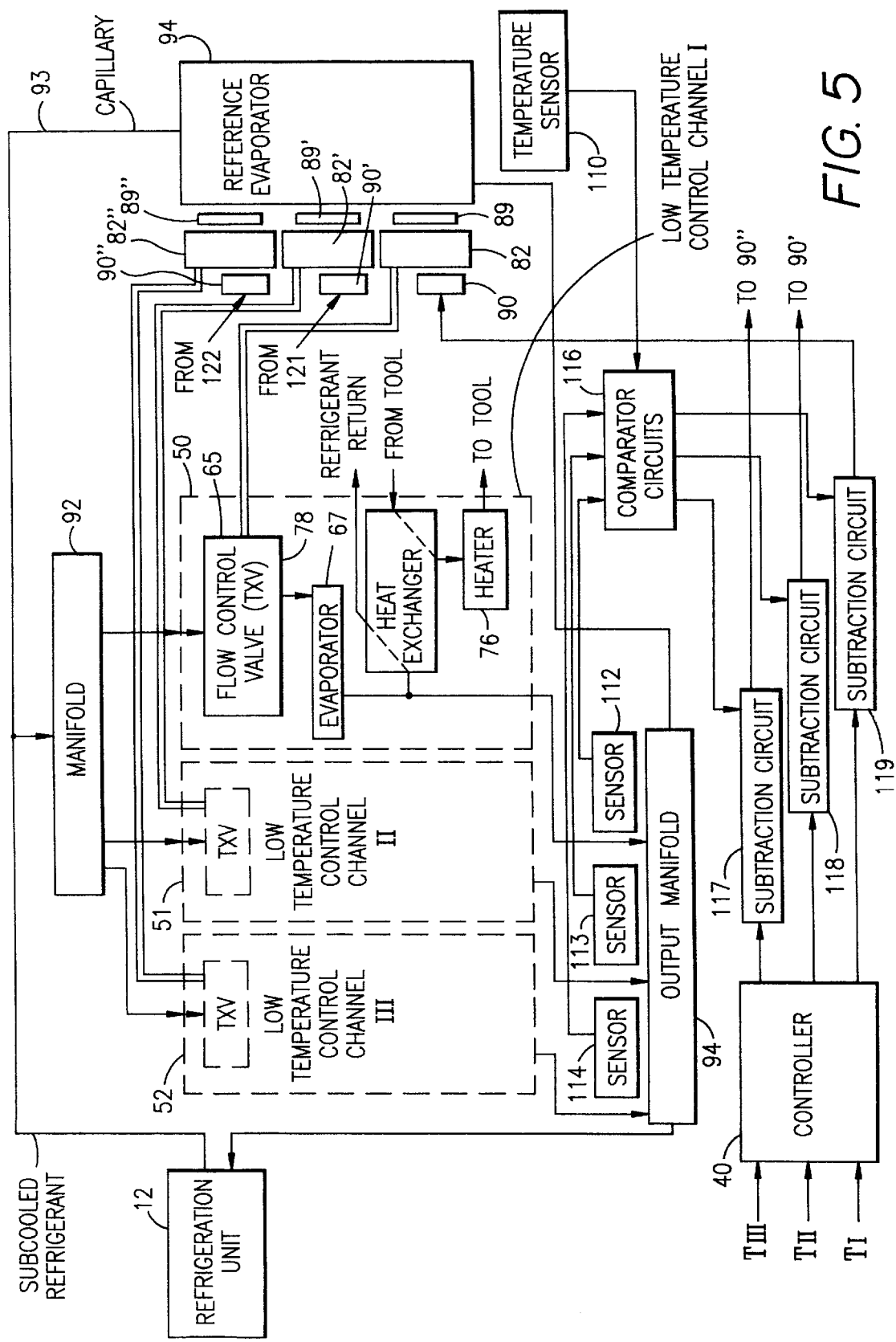
FIG. 5 is a block diagram of an alternate arrangement for stably operating multiple thermal expansion valves while also enabling rapid tool cooldown.

FIG. 5 depicts an alternative arrangement of a system for avoiding the occurrence of the astable condition in a proportional control valve system referenced above.

In this arrangement, a reference evaporator 94 fed by a capillary 93 with subcooled refrigerant is used in parallel with a manifold 92 feeding the three branches constituting temperature control channels 50, 51, 52 containing separate flow control valves (TXVs) 65. The pressures in temperature responsive bulbs 82, 82', 82" associated with the reference evaporator 94 are communicated by standard coupling conduits to control the refrigerant flow through the flow control valves (TXVs) 65, as previously described. The evaporators 67 in the channels designated I, II and III and numbered 50, 51 and 52, each control the degree of chilling of the heat transfer fluid in the heat exchangers within the evaporator/heat exchanger combinations 67 (best seen in FIG. 1). Thereafter, the outputs of the evaporators 67 are fed to the output manifold 95, and returned to the refrigeration unit 12.

In this system, however, control of the flows of subcooled refrigerant through the flow control valves 65 is regulated electronically, using the relationship between the temperatures of the individual evaporators 67 and the reference evaporator 94. A thermocouple or other temperature sensor 110 is responsive to the temperature level at the reference evaporator 94 outlet. Separate temperature sensors 112, 113 and 114 provide indications of the individual superheat levels at the outputs of the evaporators in the separate channels 50, 51, 52. Each of the sensed temperature signals from the individual branch sensors 112, 113 and 114 is compared, in comparator circuits 116, to the reference evaporator superheat level as measured by the sensor 110. Thus, three superheat difference temperature levels are provided to individual subtraction circuits 117, 118 and 119. These subtraction circuits 117, 118 and 119 are individually also in circuit with the temperature command outputs $T_{VI}$, $T_{VII}$ and $T_{VIII}$ from the controller 40 and supply control signals to the heaters 90, 90' and 90" at the bulbs 82, 82', 82" which govern the pressure and therefore the flow through the flow control valves 65. The comparator circuits 116 respond to the difference ($\Delta_T$) between the evaporator superheat in each branch and the reference evaporator superheat. As long as that difference $\Delta_T$ is greater than 10° C., no correction is made in the heater command temperature that controls flow.

If the $\Delta_T$ value is 10° C., then the subtraction circuits 120–122 reduce the heater driving temperature by 1° C. The subtraction value is increased by 1° C. for each 1° C. difference in $\Delta_T$, changing in a linear manner until the heater driving signal is reduced by 10° C. for a $\Delta_T$ difference of 0° C. In this mode of operation, flow into an evaporator is automatically throttled down if the superheat lowers to a level that approaches the superheat level established as a virtual constant by the reference evaporator. Consequently, the branch evaporators cannot reach the astable condition of operation.

Figure 6:
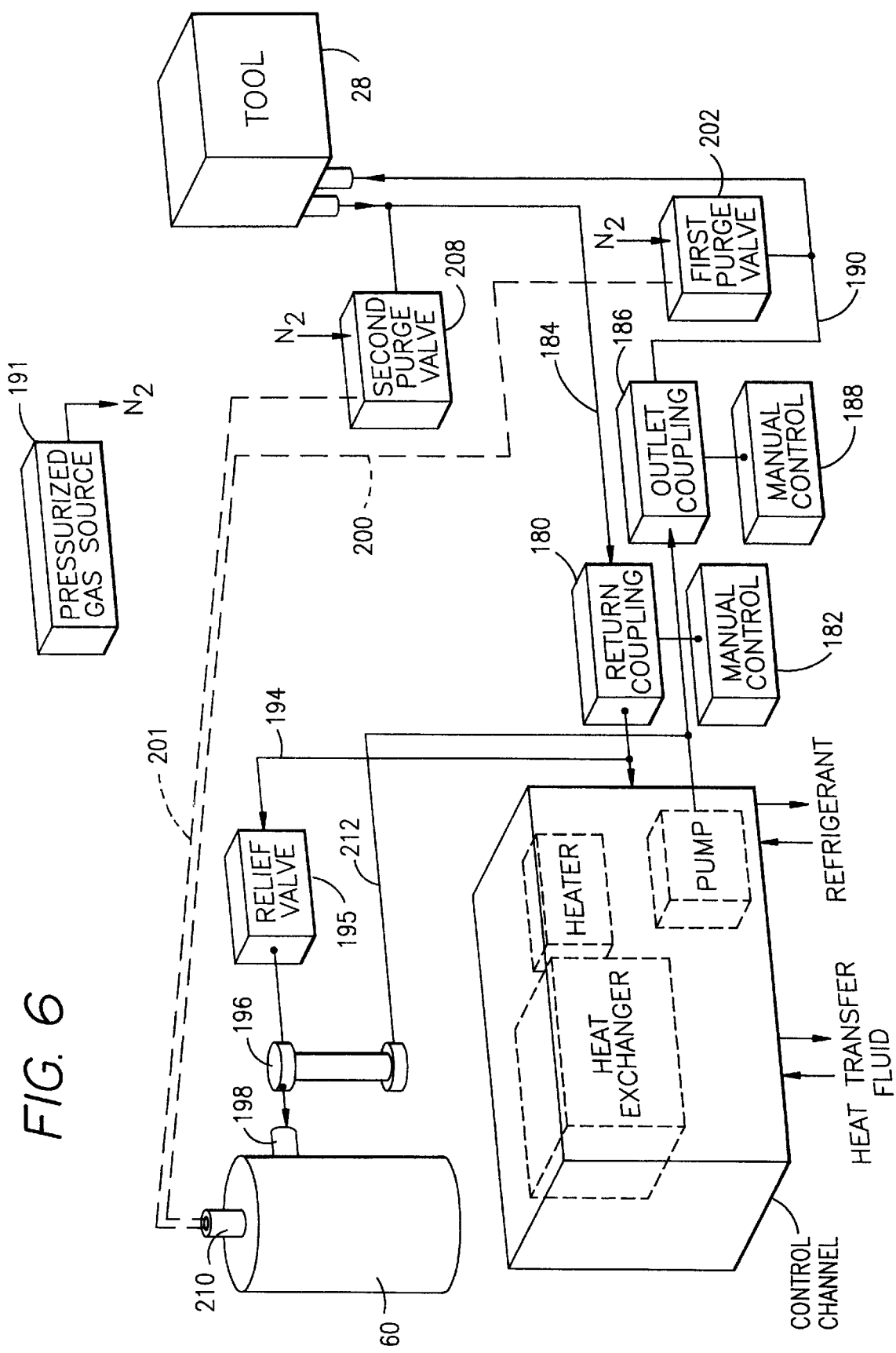
FIG. 6 is a fragmentary perspective view of the principal elements of a flush and fill subsystem in accordance with the invention.

The problem of flushing all heat transfer fluid out of the tool and the lines connecting to the tool, prior to removal of the tool from the cluster, involves more complexities than are superficially evident. Given that the heat transfer fluid must remain in the liquid state and undergo limited viscosity change across a wide temperature range from normal freezing to normal boiling, one of the perfluorinated or glycol compounds is usually, if not necessarily, used. These commercial mixes are expensive but in the past it has been regarded as inevitable that substantial amounts have been flushed or leaked onto the floor of the processing facility. Avoiding any significant loss of fluid, minimizing down time for tool disconnection and replacement, and assuring full flushing of the lines and a simplified sequence of operations are however of meaningful importance. The diagram of FIG. 6 shows how this is accomplished in each channel of the present system, where the temperature control unit 10 that receives refrigerant from the refrigeration unit (not shown) is coupled to its associated tool 28. An inlet or return coupling 180 includes a manual control 182 such as a manually operable handle for receiving the return flow on an insulated line 184 from the tool 28. An outlet coupling 186 also having a manual on/off control 188 is coupled via an insulated line 190 to the input to the tool 28 to complete the circulation loop for heat exchange fluid. The outlet line 190 includes the lowest point in the loop, which is well below the lowest point in the internal pathway to the tool 28, which is at a higher elevation.

From the return coupling 180, a small branch line 194 including a relief valve 195 leads to a recovery sight glass 196 for viewing bubbles in the fluid passing therethrough. The line 194 and sight glass 196 are coupled to a first input port 198 to the reservoir 60. This forms one path for forcing heat transfer fluid back into the reservoir 60. Separate detachable lines 200, 201 (shown by dotted lines) are adapted to be coupled to points in the conduits and to be used for either gas or liquid transfer under pressure. A pressurized tank 191 of inert gas (e.g., nitrogen) can be selectively coupled by a detachable line (not shown) to either of two different purge valves 202, 208 during different steps in the operation. A first purge valve 202 is coupled to a low point in the line 190 and can be connected via the detachable line 200 to a second input 210 to the pressurized fluid tank 60. The second purge valve 208 is located close to the input to the tool 28 in the line 184, and is be connected, at an appropriate step in the procedure, to the pressurized $N_2$ tank 191.

The operation of the flush and fill system is carried out for a given tool during down times of that tool in the cluster tool operation. Because of the extreme precision required for various tools in semiconductor fabrication, most tools incorporate some subunits with extremely tight tolerances. These tolerances cannot be maintained with extended use and wear, and thus the tools can have a finite lifetime of a few hundred hours or more. Consequently, the tools periodically have to be taken off line for replacement of critical parts or refurbishment. A new or replacement tool is put into position or the tool is returned to service after quick corrective action. Down time usually occurs on a regularly scheduled basis, but can happen irregularly if inspection shows a drop off in product quality.

When disconnection and flushing of a tool is to take place, the first step, after turning off the pump 69, is to close the return coupling 180 and the outlet coupling 186, using the manual controls 182, 188, respectively. The detachable line 200 is coupled between the first purge valve 202 and the top input port 210 to the tank 60. A gas line from the pressurized nitrogen source 191 is coupled to the second purge valve 208, and a gas pressure of 25–50 psi, which is greater than the pressure of 2–20 psi in the fluid tank 60, is applied. This effectively forces the heat transfer fluid in reverse direction from a point adjacent the tool, through and out the tool 28, past the low point in the outlet line 190 and back through the first purge valve 202 and the detachable line 200 into the tank 60. This is continued until the tool 28 is empty. The return line 184 and coupling 180 are then flushed after opening the return coupling 180, by applying purge gas pressure at the second purge valve 208 with the line 200 disconnected. The pressure forces any fluid in the return line 184 and return coupling 180 back through the pump 69 and a small branch line 212 into the sight glass and to the tank port 198. When bubbles appear in the recovery sight glass 196, or no liquid remains in the flow, the valve at the return coupling 180 is closed and the pressurized gas source 191 is shut off, completing the purge. This two step procedure is quick and convenient and assures against spillage.

As noted, the use of the low point in a connecting line assures adequately complete flushing in the shortest practical time, even though the fluid is being returned to a pressurized tank.

The connections of the coupling lines 184, 190 between the tool 28 and the return coupling 180 and outlet coupling 188 can then be disengaged, with only immaterial leakage of heat transfer fluid, if any. After reconnecting a tool, whether the same tool or a replacement, via coupling lines to the two couplings 180, 186, the refill operation can be started.

The return and outlet couplings in the valves 180, 186 are opened, after opening the second purge valve 208 to atmosphere. A small purge cup (not shown) may be kept available to receive any outflow of fluid. The pressure in the tank 60 may be augmented by gas under pressure coupled to the port 210 from the source 191. Gas pressure under these conditions drives heat transfer fluid through the line 194 from the port 198, through the outlet coupling 186, the line 190, the tool 28, the return line 184 and the line 190 and the tool 28. Fluid fills the lines and reaches the open second purge valve 208 until it begins to flow out, as into the purge cup or an absorbent pad. When this happens, the flow can be stopped and the vent closed at the second purge valve 208. The detachable line 201 is then attached between the port 210 at the top of the tank 60 and the second purge valve 208, and the pump 69 is started and run for approximately five minutes. The detachable coupling 201 can then be disconnected, with the conduit loop being ready for return to operation. The gas pressure utilized is usually in the 25–50 psi range during the flush operation, while the pressure in the fluid tank 60 is held at, or brought to the range of 2–20 psi during the fill step. This operation therefore not only assures adequately complete flushing in a short time, but easy and almost automatic filling, with only a small amount of liquid being released into a container in order to assure freedom from trapping gases internally.

The pressurized tank for heat transfer fluid offers other advantages, inasmuch as it maintains balance in the system.

By keeping the lines filled with replenishment fluid in the event there is any loss or leakage, the pressurized system limits any tendency of the pumps to cavitate due to inadequate liquid or pressure in the lines. The coolants used include those perfluorinated compounds sold under the trademarks "Gaulden" and "Fluorinet". In the compact motor/pump combination, these coolants are used as hydrodynamic bearing fluids within an enclosed rotor, so as to ensure longer life under virtually continuous operation.

Figure 7:
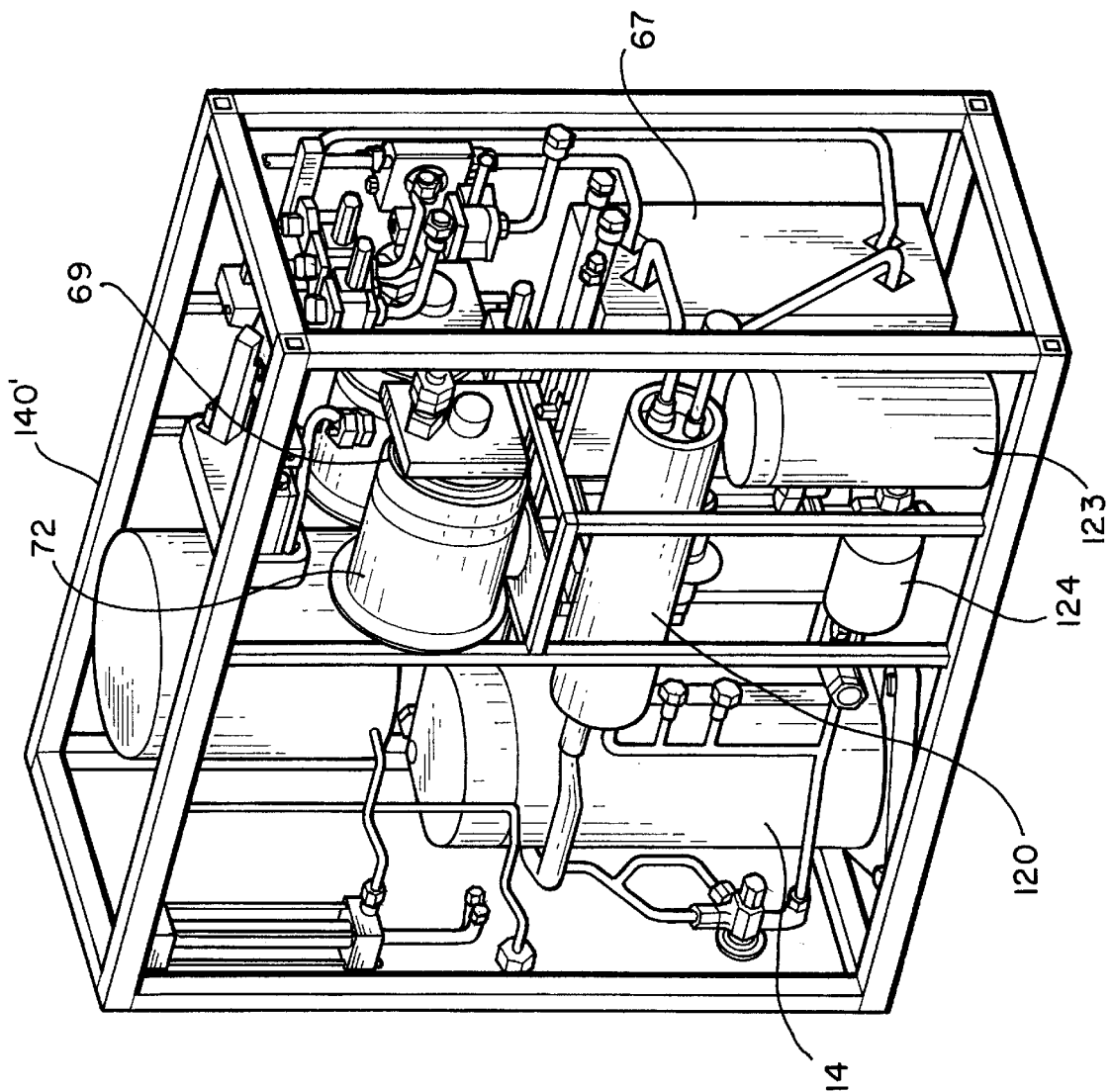
FIG. 7 shows an alternative arrangement of the system in accordance with the invention for providing different combinations of chilled and unchilled channels while at the same time preserving the desired low area footprint.

Referring to FIG. 7, the geometry of another system in accordance with the invention is shown having superior operating versatility while at the same time requiring only limited floor space. What is shown in FIG. 7 is a system which, with a like frame and refrigeration unit to the FIG. 4 system, can provide 1, 2 or 3 temperature control channels. In this system, one or two of the channels can be chilled (here operated to a minimum temperature of −40° C.) or heated while the unchilled channel or channels can be operated from ambient temperature to approximately 100° C. or more. Furthermore, all temperatures can again be separately controlled, as described in the previous example. A practical system of this type has a length of 36 inches, a height of 30 inches and a depth of 14 inches and is designed such that the units can be stacked two high. Stacked two high to provide a maximum capacity of six channels, the footprint is less than 0.6 ft.$^2$ per channel. This versatility allows the semiconductor fabrication facility to adapt the temperature control units to a wide variety of cluster tools.

The configuration of FIG. 7, using single chilled channel can operate with a 1.5 KW refrigeration capacity, provided by an upstanding compressor 14 at one side of the base of the frame 140'. The same advanced refrigeration functions are included, comprising a horizontally mounted subcooler 120, filter 124, and bypass and desuperheat functions obscured behind a refrigerant receiver 123 at one side of the base of the frame 140'. One or two compact evaporators 67 for the chilled channel or channels, and heat exchangers for the unchilled channels, are also mounted on the floor of the frame 140'. Again, heating functions are made available for all channels.

As seen in FIG. 7, the valve and port connections to exterior lines (not shown) for the passage of coolant to a fabrication tool are disposed along a side access plane of the frame 140'. Because only three channels are used at a maximum, the side of the frame is adequate in area for these connections, which are made possible because the three motor 72 and pump 69 combinations are mounted horizontally, in side-by-side relation and do not require either substantial length or width. An upper corner of the frame 140' is occupied by the pressurized reservoir 60 for heat transfer fluid, and the unit includes the same capability as previously described for flush and fill operations in each channel.

Although there have been described above and illustrated in the drawings a number of forms and modifications in accordance with the invention, it will be appreciated that the invention is not limited thereto but encompasses all expedients and variants in accordance with the appended claims.

What is claimed is:

1. The method of controllably regulating the separate temperatures of at least a number of the tools in a cluster tool comprising the steps of:

passing pressurized heat transfer fluid in individual thermal exchange relation with different separate tools;

providing a single flow of refrigerant having refrigeration capacity adequate for the concurrent refrigeration maximum of at least some of those of the tools that are to be refrigerated below ambient level;

branching the refrigerant into separate heat exchange paths in thermal interchange relation with the heat transfer fluid, one path for each control loop associated with a tool that is to be lowered below ambient temperature;

providing separate control signals representative of the current temperature level desired for the different individual tools; and individually controlling the temperatures of the heat transfer fluids in each of the separate control loops by varying the temperatures of the refrigerants in those branches to maintain the temperatures of the tools at their desired levels.

2. The method as set forth in claim 1 above, wherein the refrigerant is provided as a high pressure subcooled refrigerant and wherein the step of varying the temperature of the refrigerant in the branches comprises evaporating refrigerant at a rate in each branch responsive to the control signal for the control loop to establish a desired lower temperature.

3. The method as set forth in claim 2 above, wherein the tools are at times to be raised in temperature above the ambient level, and wherein the method further comprises the step of heating the heat transfer fluid in the control loops in accordance with the control signals and the method further comprises the step of returning the refrigerant to a single flow for recompression after evaporation.

4. The method as set forth in claim 3 above, wherein the cluster tool includes at least one tool that need be cooled only to an ambient level, and wherein the method further comprises the steps of providing a coolant at ambient temperature level, passing the ambient temperature level in thermal interchange relation with the heat transfer fluid for the associated at least one control, loop, and varying the temperature of the heat transfer fluid to be provided to the at least one associated tool by varying the flow of the ambient coolant in on/off fashion.

5. A method as set forth in claim 4 above, further including the step of varying the rate of evaporation of refrigerant in the different branches by proportional control including a temperature responsive compressible fluid in each branch, and further initiating rapid cooldown by a separate flow of low temperature evaporated refrigerant at cooldown transitions indicated by the control signals.

6. The method for controllably regulating the separate temperatures of different devices with a single temperature control unit comprising the steps of:

passing pressurized heat transfer fluid in individual thermal exchange relation with different ones of the devices;

providing a single flow of subcooled, pressurized refrigerant adequate in refrigeration capacity to meet the demands for refrigeration of the different devices;

branching the subcooled refrigerant into separate heat exchange paths for the different devices; and individually controlling the temperatures of the different devices by evaporating the refrigerant in the separate branches at different flow rates.

7. The method of removing pressurized thermal control fluid from a selected semiconductor fabrication tool connected by input and output lines to a temperature control unit including a pressurized thermal control fluid source comprising the steps of:

closing off the lines at the temperature control unit;

feeding a gas under pressure into one line in the region of a low point in the lines while coupling a region of the other lines adjacent the tool to the fluid source to drive thermal control fluid from the low point in the first line, the tool and, from a part of the second line into the pressurized thermal control fluid source;

opening the said one line at the temperature control unit;

feeding the gas under pressure into the said other line adjacent the tool to drive the thermal control fluid remaining in the said other line and tool back into the source; and closing off both lines.

8. The method as set forth in claim 7 above further including the step of refilling the lines and the tool with thermal control fluid including the steps of:

opening both the first and second lines at the control unit;

venting the connected lines to atmosphere near the tool; and allowing the pressurized thermal control fluid to flow from the source into the lines and the tool.

9. The method as set forth in claim 8 above, further including the steps of:

determining when fluid has been driven back toward the source through the said other line by observing the presence of at least bubbles in the line;

maintaining the pressurized thermal fluid control source at a pressure of 10–25 psi;

pressurizing with a gas pressure of greater than 25 psi; and continuing the refilling until liquid appears at the venting point.

10. The method of isolating a tool in a cluster tool from a source of heat transfer fluid conducted to and from a control channel by a pair of disconnectable lines, at least one of which is below the tool, comprising the steps of:

providing a source of pressurized heat transfer fluid to the lines;

first purging the heat transfer fluid from a part of the disconnectable lines by driving the fluid under gas pressure from a low region of the lines through the tool and toward the source from a point near the tool;

again purging the heat transfer fluid from a part of the disconnectable lines by driving the fluid under gas pressure from the point near the tool and through a part of the control channel toward the source;

disconnecting the tool from the control channel for appropriate servicing or replacement;

reconnecting the tool to the control channel; and refilling the control loop from the pressurized reservoir.

11. The method as set forth in claim 10 above, wherein the pressure of the purging gas is higher than the pressure of the reservoir, and further including the steps of venting gas from the interior of the control loop after reconnection, and refilling the interior loop until liquid begins to vent from the system.

12. For separately controlling the temperature of a number of processing tools with a heat exchange fluid, a method comprising the steps of:

providing a flow of pressurized low temperature refrigerant having sufficient refrigeration capacity for the total concurrent needs of the processing tools;

flowing the refrigerant into different branches, one for each tool to be refrigerated;

controlling the refrigerants flows in the different branches in accordance with desired temperatures by lowering the pressure of the refrigerant in each branch to a selected individual level; and circulating the heat exchange fluid in separate loops in thermal relation to the tools and to the controlled refrigerant flows.

13. A method as set forth in claim 12 above, further including the step of selectively heating heat exchange fluid in selected ones of the heat exchange loops to raise the temperature of the processing tool above the ambient level.

\* \* \* \* \*